US012587233B2

(12) United States Patent
Frankiewicz et al.

(10) Patent No.: US 12,587,233 B2
(45) Date of Patent: Mar. 24, 2026

(54) METHOD FOR DIGITAL WIRELESS COMMUNICATION THROUGH A BARRIER MADE OF CONDUCTIVE MATERIAL, SYSTEM FOR PERFORMING SUCH COMMUNICATION, AND SYSTEM FOR MONITORING THE LEVEL OF FLUID CONTENT IN METAL CONTAINER

(71) Applicant: AIUT SP. Z O. O., Gliwice (PL)

(72) Inventors: Artur Frankiewicz, Gliwice (PL); Marek Gabrys, Gliwice (PL)

(73) Assignee: AIUT SP. Z O. O., Gliwice (PL)

( * ) Notice: Subject to any disclaimer, the term of this patent is extended or adjusted under 35 U.S.C. 154(b) by 316 days.

(21) Appl. No.: 18/563,574

(22) PCT Filed: May 23, 2022

(86) PCT No.: PCT/IB2022/054794
§ 371 (c)(1),
(2) Date: Nov. 22, 2023

(87) PCT Pub. No.: WO2022/249024
PCT Pub. Date: Dec. 1, 2022

(65) Prior Publication Data
US 2024/0259046 A1 Aug. 1, 2024

(30) Foreign Application Priority Data
May 25, 2021 (EP) ..................................... 21175775

(51) Int. Cl.
*H04B 5/26* (2024.01)
*H04B 5/77* (2024.01)
*H04B 5/79* (2024.01)

(52) U.S. Cl.
CPC ............... *H04B 5/26* (2024.01); *H04B 5/263* (2024.01); *H04B 5/77* (2024.01); *H04B 5/79* (2024.01)

(58) Field of Classification Search
CPC . H04B 5/26; H04B 5/263; H04B 5/77; H04B 5/79; H04B 5/48; H04B 5/73; G06K 7/10336; G06K 19/06187
(Continued)

(56) References Cited

U.S. PATENT DOCUMENTS

| | | |
|---|---|---|
| 8,364,079 B2 | 1/2013 | Rhodes et al. |
| 2010/0069000 A1 | 3/2010 | Nakagawa |

(Continued)

FOREIGN PATENT DOCUMENTS

| | | | | |
|---|---|---|---|---|
| EP | 1592142 A1 | 11/2005 | | |
| GB | 2518384 A | * 3/2015 | ............. | G01V 3/104 |
| WO | WO 2020/237915 A1 | 12/2020 | | |

OTHER PUBLICATIONS

WIPO, EPO as International Search Authority, International Search Report and Written Opinion mailed Sep. 23, 2022 in International Patent Application No. PCT/IB2022/054794, 18 pages.
(Continued)

*Primary Examiner* — Eugene Yun
(74) *Attorney, Agent, or Firm* — MASUVALLEY & PARTNERS; Peter Martinez

(57) ABSTRACT

A method for digital wireless communication through a barrier (6) made of a conductive material, preferably metal, consisting in transmission of an encoded digital information using a transmitter (1), by generation of a static magnetic field with a stepwise variable spatial orientation of the magnetic induction vector on a first side of the barrier (6), then reading a resulting spatial orientation of the magnetic induction vector on a second side of the barrier (6) using an
(Continued)

at least one spatial orientation sensor of the magnetic induction vector located in a receiver (3), and subsequently decoding the digital information from the stepwise variable spatial orientation of the magnetic induction vector by means of a reading system (4) connected to the receiver (3). The invention comprises also a system for performing digital wireless communication through a barrier and a system for monitoring the level of fluid content in a metal air-tight container.

12 Claims, 3 Drawing Sheets

(58) Field of Classification Search
USPC ........................................................ 455/41.1
See application file for complete search history.

(56) References Cited

U.S. PATENT DOCUMENTS

| | | |
|---|---|---|
| 2010/0110837 A1 | 5/2010 | Jung et al. |
| 2014/0155098 A1 | 6/2014 | Markham et al. |

OTHER PUBLICATIONS

Lara-Castro, M. et al., "Portable signal conditioning system of a MEMS magnetic field sensor for industrial applications", vol. 23, No. 1, Microsystem Tehcnologies, Retrieved from the internet: URL: https://link.springer.com/article/10.1007/s00542-016-2816-4, Jan. 18, 2016, pp. 215-223, 9 pages.

* cited by examiner

METHOD FOR DIGITAL WIRELESS COMMUNICATION THROUGH A BARRIER MADE OF CONDUCTIVE MATERIAL, SYSTEM FOR PERFORMING SUCH COMMUNICATION, AND SYSTEM FOR MONITORING THE LEVEL OF FLUID CONTENT IN METAL CONTAINER

RELATED APPLICATIONS

This application is the U.S. National Phase of and claims priority to International Patent Application No. PCT/IB2022/054794, International Filing Date May 23, 2022, entitled Method For Digital Wireless Communication Through A Barrier Made Of Conductive Material, System For Performing Such Communication, And System For Monitoring The Level Of Fluid Content In Metal Container, which claims benefit of European Application No. 21175775.2 filed May 25, 2021, both of which are incorporated herein by reference in their entireties.

TECHNICAL FIELD

The invention relates generally to digital wireless communication through a barrier made of a conductive material. More specifically, the invention relates to a method and system for performing such communication, enabling communication with devices placed inside a sealed container, preferably made of metal, using a slowly varying magnetic field for this communication.

BACKGROUND

The rapid development of the Internet Of Things technology poses new challenges in the area of mobile communication. Most existing technologies use electromagnetic waves (RF communication) to transmit data by air. This method of communication is efficient in terms of energy consumption, range and speed of communication. The RF communication is not, however, transferred through metal barriers. As a result, it is impossible to transmit the RF signal from inside of a closed metal housing. The problem is commonly known as the Faraday cage effect. In such cases, the radio communication cannot be implemented and other communication methods must be used.

US20100110837A1 discloses a method for communication by means of an acoustic (mechanical) wave. This type of communication can penetrate metal obstacles. In addition, the sound signal can travel over long distances in a metal conductor. This solution gives satisfactory results, but cannot be used in noisy environments, thus being useless in many applications.

EP1592142A1 discloses a method for communication through a metal barrier based on magnetic phenomena. The use of an electromagnetic induction method brought a breakthrough in the modern technology. The solution proposed in the aforementioned document allows for communication through a metal barrier and is completely resistant to external acoustic noise. The solution has been developed with communication through thick metal walls in mind. Since the receiving unit is based on an induction coil, the communication requires to use a carrier frequency for data transmission. The solution generates large energy losses due to eddy currents. A transmitter located inside thick metal walls would be required to emit a large amount of energy to reach the detection sensitivity level of the receiver component. The eddy currents can be reduced by decreasing the transmission frequency, but this approach requires the use of large induction components.

U.S. Pat. No. 8,364,079B2 discloses a communication method wherein the receiver can also be based on a Hall sensor instead of an induction coil. This approach allows for communication without using a carrier frequency, in which the signal is not so strongly attenuated by eddy currents. The solution with a Hall sensor, which is characterized by high power consumption and low sensitivity, does not, however, allow for miniaturization.

WO2020237915A1 discloses a wireless communication apparatus comprising at least one ultrasonic wave channel, wherein each ultrasonic wave channel comprises a first transducer arranged on one side of a metal barrier and a first signal processing circuit connected to the first transducer, and a second transducer arranged on the other side of the metal barrier and a second signal processing circuit connected to the second transducer. The wireless communication apparatus uses ultrasonic waves outside of the hearing range of human ears as an information conversion medium to pass through a metal barrier for information transmission, thereby realizing the high-speed error-free transmission of information without destroying the integrity of the metal barrier. The wireless communication apparatus realizes non-contact ultrasound emission to the metal barrier and non-contact ultrasound receiving from the metal barrier by using electromagnetic acoustic transducers.

US2010069000A1 discloses a semiconductor device which performs signal transmission by using inductor coupling. The semiconductor device comprises one or more transmission and reception coil pair, each pair comprising a single transmission coil and a plurality of reception coils, or a plurality of transmission coils and a single reception coil, or a plurality of transmission coils and a plurality of reception coils.

SUMMARY OF THE INVENTION

One of the objectives of the present invention is to propose a new method for wireless communication through metal barriers that is free from the drawbacks of the known solutions.

Another objective of the invention is to develop a system for digital wireless communication system that allows for data transmission from a measuring sensor inside a cylinder with a liquid medium, especially LPG fuel, where the measuring and communication component must be comprised inside a brass valve closing the cylinder.

According to the first invention, there is provided a method for digital wireless communication through a barrier made of a conductive material, preferably metal, consisting in transmission of an encoded digital information using a transmitter, by generation of a static magnetic field with a stepwise variable spatial orientation of a magnetic induction vector on a first side of the barrier, then reading a resulting spatial orientation of the magnetic induction vector on a second side of the barrier using an at least one spatial orientation sensor of the magnetic induction vector located in the receiver, and subsequently decoding the encoded digital information from the stepwise variable spatial orientation of the magnetic induction vector using a reading system connected to the receiver, wherein the method comprising the following steps:
  a. generating a static magnetic field with a first spatial orientation of the magnetic induction vector by an at least one induction coil, preferably of the transmitter, by exciting it with a current of a first constant intensity value on the first side of the barrier;

b. reading, with the receiver, the first resulting spatial orientation of the magnetic induction vector of the static magnetic field produced by the at least one induction coil, which the first resulting spatial orientation of the magnetic induction vector of the static magnetic field is additionally distorted by the barrier as well as an Earth's magnetic field and magnetic objects in the vicinity of a communication path on the second side of the barrier;

c. assigning a first digital value in the reading system connected to the receiver to the first resulting spatial orientation of the magnetic induction vector of the static magnetic field;

d. generating of a static magnetic field with a second resulting spatial orientation of the magnetic induction vector of the static magnetic field by reversing the static magnetic field produced by the at least one induction coil by changing the first value or polarity of the excitation current of the at least one induction coil;

e. reading, with the receiver, the second resulting spatial orientation of the magnetic induction vector of the static magnetic field produced by the at least one induction coil, which the second resulting spatial orientation of the magnetic induction vector of the static magnetic field is additionally distorted by the barrier as well as the Earth's magnetic field and magnetic objects in the vicinity of the communication path on the second side of the barrier;

f. assigning a second digital value in the reading system connected to the receiver to the second resulting spatial orientation of the magnetic induction vector of the static magnetic field;

g. encoding a digital information as a sequence of combinations of the first or the second resulting spatial orientation of the magnetic induction vector of the static magnetic field by the transmitter;

h. reading a combination of the first or the second resulting spatial orientation of the induction vector of the static magnetic field by the receiver and decoding the digital information by the reading system connected to the receiver.

Preferably, the resulting spatial orientation of the magnetic induction vector of the static magnetic field is generated using at least two axially non-parallel oriented coils by independent current excitation thereof.

Preferably, the digital information is encoded with more than two resulting spatial orientations of the magnetic induction vector of the static magnetic field.

Preferably, the spatial orientation of the magnetic induction vector of the static magnetic field is measured in at least two geometric dimensions.

Preferably, the encoded digital information is assigned to a particular resulting spatial orientation of the magnetic induction vector of the static magnetic field.

Preferably, the encoded digital information is assigned to a particular sequence of at least two different resulting spatial orientations of the magnetic induction vector of the static magnetic field.

Preferably, the reading of the spatial orientation of the magnetic induction vector of the static magnetic field is performed with the use of highly precise MEMS, Hall or magnetostrictive type sensors of spatial orientation of the static magnetic field.

According to the second invention, there is provided a system for performing digital wireless communication through a barrier made of a conductive material, preferably metal, comprising a transmitter, a digital information encoder in the form of a static magnetic field generator with a stepwise variable spatial orientation of a magnetic induction vector on a first side of the barrier, a receiver of the spatial orientation of the magnetic induction vector on a second side of the barrier, a reading system, and a digital information decoder, wherein the static magnetic field generator with the stepwise variable spatial orientation of magnetic induction vector is composed of an at least one induction coil excited with a current of stepwise variable intensity and polarity, and the receiver comprises spatial orientation sensors of the static magnetic field, preferably of the MEMS type.

Preferably, the receiver reads the spatial orientation of the magnetic induction vector of the static magnetic field in at least two geometric dimensions.

Preferably, the static magnetic field generator with a stepwise variable spatial orientation of the magnetic induction vector is composed of at least two separately excited induction coils oriented axially non-parallel to each other.

According to a third invention, there is provided a system for monitoring the level of fluid content in a metal air-tight container, the system comprising an air-tight container, preferably a gas cylinder for storing a liquified gas, and further comprises a valve or a sealed lid, a transmitter inside the container, and a receiver placed outside the container temporarily or permanently, wherein the transmitter and the receiver are constructed in the form of a system according to the second invention.

ADVANTAGEOUS EFFECTS OF THE INVENTION

The use of the method and system according to the invention allows for effective communication from within the metal container. Compared to prior art solutions, significant miniaturization of the solution is possible by using a very small communication induction coil. At the same time, the technology allows for a much lower energy expenditure for transmission of information through the barrier. The solution can also be used for communication through metals with a very high electrical conductivity coefficient, such as copper, brass, aluminium.

OTHER ADVANTAGEOUS EFFECTS

The invention can be operated on both types of metal barriers, i.e., on those with high magnetic permeability (e.g. steel), as well as on materials with low magnetic permeability but very good electrical conductivity (e.g. copper, brass).

The invention requires considerably less energy than any other reported method for communication through the barrier, allowing the solution to be greatly minimized.

The invention allows any modulation technique to be used as no carrier frequency is required.

Due to the low communication speed and slowly varying magnetic field, the communication is not weakened by the barrier and the parasitic effect of eddy currents arising in the barrier.

With the use of a high accuracy MEMS sensor, the invention can provide considerable communication distances.

The invention is resistant to any changes in magnetic permeability caused by variations in the ambient temperature or chemical composition of the barrier.

BRIEF DESCRIPTION OF DRAWINGS

Embodiments of the present inventions are shown in the drawings, where.

DETAILED DESCRIPTION OF PREFERRED EMBODIMENTS OF THE INVENTIONS

Figure 1:
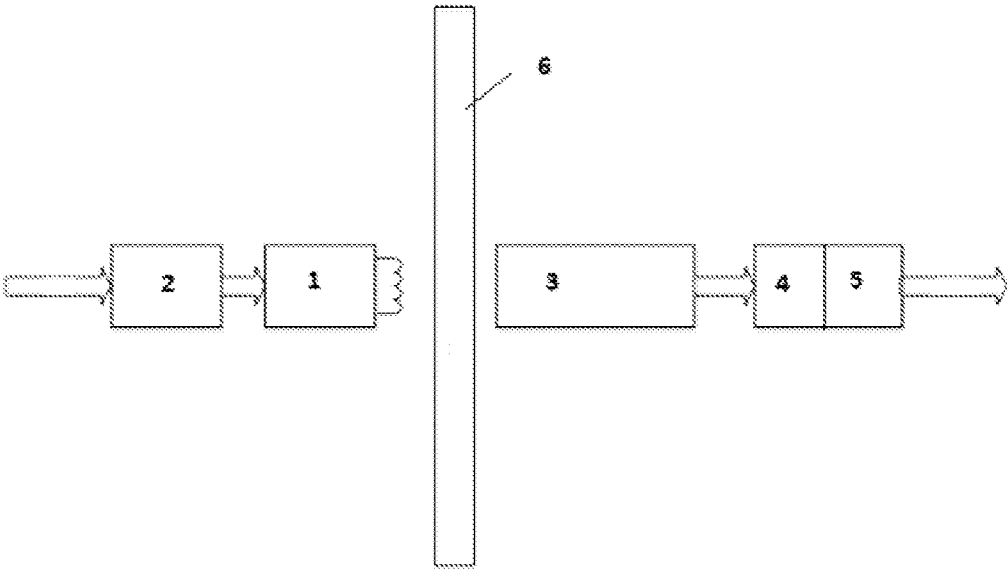
FIG. 1—shows a communication scheme with all system components according to the present invention.

A method for digital wireless communication through a barrier 6 made of a conductive material, according to the first invention, is schematically shown in FIG. 1.

According to a preferred embodiment, the method consists in wireless communication through a metal barrier 6, e.g. through a wall of container for storing fluid, preferable a gas cylinder for LPG or LNG storage, or through a valve wall. A method for digital wireless communication through a barrier 6 made of metal (carbon fiber or other conductive material), according to the preferred embodiment, consists in transmitting an encoded digital information using a transmitter 1. The transmitter 1, having an induction coil, preferably an at least one induction coil, and a circuit for controlling it, generates a static magnetic field with a stepwise variable spatial orientation of a magnetic induction vector (one piece of information corresponds to one orientation). The transmitter 1 is located on a first side of the barrier 6, typically inside the gas cylinder. On a second side of the barrier 6 there is a receiver 3 which reads a resulting (distorted by the barrier 6 and the surroundings) spatial orientation of the magnetic induction vector by means of an at least one spatial orientation sensor of the magnetic induction vector. Then, a digital information is decoded from the stepwise variable spatial orientation of the magnetic induction vector by means of a reading system 4 connected to the receiver 3. The method shown in this embodiment comprises the following steps:

a. generation of a static magnetic field with a first spatial orientation of the magnetic induction vector by the induction coil by exciting it with a current of a first constant intensity value on the first side of the barrier 6;

b. reading, with the receiver 3, a first resulting spatial orientation of the magnetic induction vector of the static magnetic field produced by the induction coil, which the first resulting spatial orientation of the magnetic induction vector of the static magnetic field is additionally distorted by the barrier 6 as well as an Earth's magnetic field and magnetic objects in the vicinity of a communication path on the second side of the barrier 6;

c. assigning a first digital value in the reading system 4 connected to the receiver 3 to the first resulting spatial orientation of the magnetic induction vector of the static magnetic field;

d. generation of a static magnetic field with a second resulting spatial orientation of the magnetic induction vector of the static magnetic field by reversing the static magnetic field produced by the induction coil by changing the value or polarity of the excitation current of the induction coil;

e. reading, with the receiver 3, the second resulting spatial orientation of the magnetic induction vector of the static magnetic field produced by the induction coil, which the second resulting spatial orientation of the magnetic induction vector of the static magnetic field is additionally distorted by the barrier 6 as well as the Earth's magnetic field and magnetic objects in the vicinity of the communication path on the second side of the barrier 6;

f. assigning a second digital value in the reading system 4 connected to the receiver 3 to the second resulting spatial orientation of the magnetic induction vector of the static magnetic field;

g. encoding a digital information as a sequence of combinations of the first or the second resulting spatial orientation of the magnetic induction vector of the static magnetic field by the transmitter 1;

h. reading a combination of the first or the second resulting spatial orientation of the induction vector of the static magnetic field by the receiver 3 and decoding the digital information by the reading system 4 connected to the receiver 3.

In another preferred embodiment, the resulting spatial orientation of the magnetic induction vector of the static magnetic field is generated using at least two axially non-parallel oriented (e.g. perpendicularly aligned) induction coils by exciting them independently by the current.

In another, preferred embodiment, the digital information is encoded with more than two resulting spatial orientations of the magnetic induction vector of the static magnetic field.

If the system has one induction coil, it can be used to encode the digital information by quantizing the length and sense (spatial orientation) of the magnetic induction vector of the static magnetic field. An example could be to encode five cylinder capacity values 0; 25%; 50%; 100%; Overfilled cylinder; by assigning them successively the following lengths of the vector B $$B_0 < B_1 < B_2 < B_4$$

wherein the vectors $B_0$ to $B_4$ point towards the first direction. The digital information marked "Overfilled cylinder" can be encoded by assigning it to the vector B with the opposite sense to that of the vectors $B_0$ to $B_4$ and any value greater than 0. This example shows how broad are the possibilities of encoding information with the only one induction coil and in one geometric dimension of the spatial orientation of the induction vector (the length and sense only).

In another, alternatively preferred embodiment, where two induction coils with perpendicular axes oriented in a plane parallel to the gas cylinder axis are used to encode the digital information, the amount of encodable information increases. With two perpendicularly arranged induction coils, it is possible to encode by using the length, sense or angle (direction) of the magnetic induction vector. Such encoding can take place in two geometric dimensions (direction and length) plus the sense.

It is also possible to use a third induction coil arranged non-parallel with respect to other coils. By using three non-parallel, and preferably mutually perpendicular induction coils, it is possible to encode in three geometric dimensions (direction and length) plus the sense.

The direction, sense, and length of a vector are referred to as the vector orientation.

The digital information is assigned to a particular resulting spatial orientation of the magnetic induction vector of the static magnetic field. In another, alternatively preferred embodiment, the digital information is assigned to a particular sequence of at least two different resulting spatial orientations of the magnetic induction vector of the static magnetic field.

The encoding of digital information is performed analogously to the encoding in binary systems and relates to encoding of individual states of the system (individual "bits") or whole "bit" words.

In a preferred embodiment, the reading of the spatial orientation of the magnetic induction vector of the static magnetic field is performed using high precision static magnetic field orientation sensors of the MEMS, Hall or magnetostrictive type.

Figure 2:
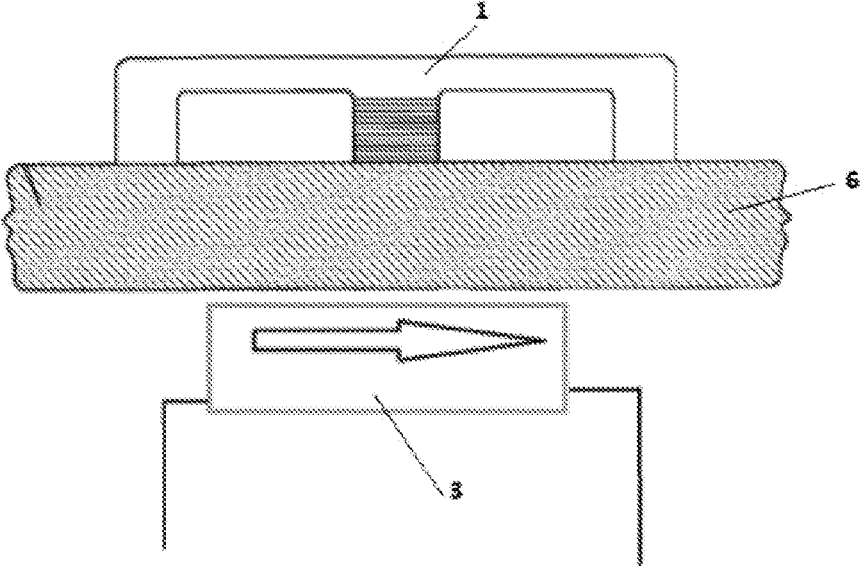
FIG. 2—shows an embodiment with an E-shaped magnetic core transmitter.

An embodiment also includes a system for performing digital wireless communication through a barrier 6 made of a conductive material, preferably metal (FIG. 1). The system comprises:

1. A transmitter 1 made of a static magnetic field emitting component, mostly an induction coil. The induction coil is an inductive element placed, e.g. parallel to a metal barrier and can be used for communication through the metal barrier 6 with low magnetic permeability. For communication through a metal such as carbon steel with high magnetic permeability, a larger induction coil or an E-shaped magnetic core can be used (FIG. 2).

2. A digital information encoder in the form of a static magnetic field generator with a stepwise variable spatial orientation of the magnetic induction vector on the first side of the barrier 6. The encoder is a component or a circuit that converts information, e.g. digital information, into modulation (change) of a physical quantity, e.g. wave amplitude, spatial orientation of a physical quantity vector, e.g. polarity. The circuit typically includes an interface (e.g. a transmitting antenna or wired jack) allowing for transmission of the modulated physical quantity to the receiver circuit. A common solution is to first amplify the signal with a power amplifier. An example is the radio wave modulation, e.g. amplitude modulation (AM).

3. A receiver 3 of the spatial orientation of a magnetic induction vector on the second side of the barrier 6 of a conductive material capable of generating eddy currents under the action of a variable magnetic field, for example a steel wall of a gas cylinder or a brass valve.

4. A reading system 4, i.e. a sensor converting the spatial orientation of a magnetic induction vector into an electrical or digital signal. Sensors of this type are used, for example, in electronic compasses, they convert the angular position of the Earth's field lines (the magnetic induction vector) into the position of the indicator on the screen or the numerical value of an angle. Typically, these are highly sensitive magneto-impedance sensors, e.g. magnetostrictive sensors, for example, fabricated in the MEMS technology. Their advantage is a short conversion time, which allows for high data transmission speeds. This component preferably comprises the digital information decoder 5.

5. A digital information decoder 5. The decoder (demodulator) is the opposite of a digital information encoder (modulator). Its basic function is to separate the background measurement (the Earth's natural magnetic field) from the useful signal generated on the second side of the barrier 6 and to decode the modulated physical signal (a series of different spatial orientations of the induction vector) into a series of digital information, e.g. a bit sequence, bit word or data bit value.

6. A barrier 6—an object located in the communication path between the transmitter 1 and the receiver 3, capable of interfering or preventing radio communication (performed by electromagnetic waves). The barrier can be made of any electrically conductive material in which, due to electromagnetic wave penetration, eddy currents are generated that attenuate the electromagnetic signal. Typically they are metals and composites of conductive fibers (carbon, metal, carbide).

The static magnetic field generator with a stepwise variable spatial orientation of the magnetic induction vector is composed of at least one induction coil excited by a current with a stepwise variable intensity and polarity, and the receiver has spatial orientation sensors of a static magnetic field, preferably of the MEMS type. The receiver reads the spatial orientation of the magnetic induction vector of the static magnetic field in at least one geometric dimension (length and sense of the magnetic induction vector).

In another embodiment, the transmitter 1 is composed of at least two separately excited induction coils oriented axially non-parallel to each other.

The embodiments described herein may form a system for monitoring the level of fluid content in a metal, air-tight container, preferably a gas cylinder for storing a liquified gas, the system comprising:

an air-tight container, a valve or a sealed lid,
a transmitter 1 inside the container and a receiver 3 placed outside the container temporarily or permanently.

Figure 3:
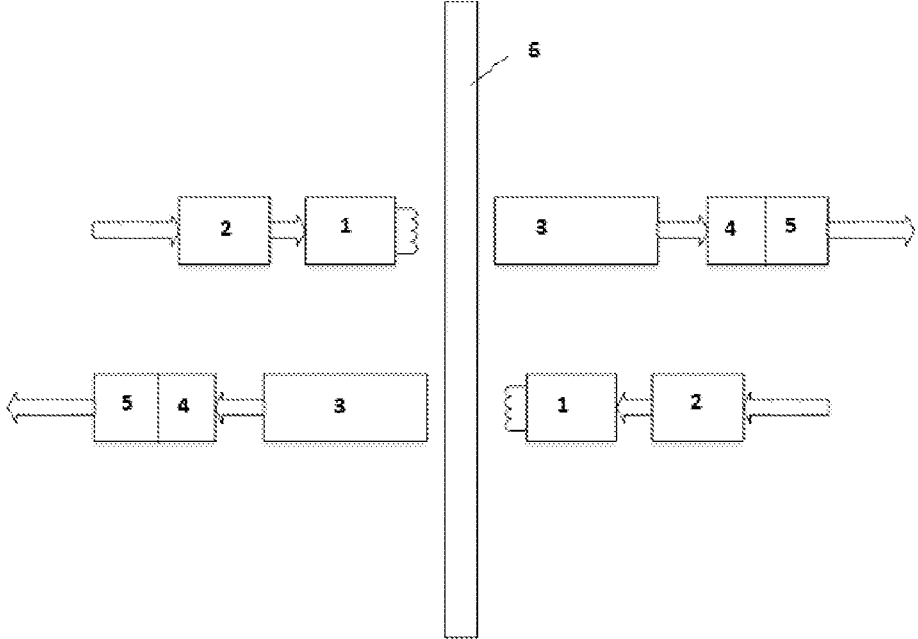
FIG. 3—shows a more complex embodiment of two-way communication.

A system for performing digital communication through a metal barrier 6 according to the second invention is schematically shown in FIG. 3.

In a preferred embodiment, the transmitter is a single induction coil which generates magnetic field due to the flow of electric current.

A permanent magnetic field is not absorbed by the barrier 6. In the case of non-magnetic metals, such as copper, the field propagates freely through the material. In the case of magnetic metals such as steel, the field lines close in front of the barrier, but their presence is also measurable on the opposite side of the barrier 6.

The induction coil of the transmitter 1 generates a magnetic field of a given orientation transmitting the logic state 0. In the case of transmitting the logic state 1, the magnetic field orientation is reversed by changing the polarity of the induction coil excitation current. In this way, a bit stream (information flow) is generated.

The receiver 1 uses a highly sensitive magnetostrictive MEMS sensor. The operation of the transmitter 1 disturbs the natural magnetic Earth's field, yielding a distorted, resulting magnetic field that can be recognized by the receiver 2. This allows for detection of a constant in time magnetic field.

The transmitter 1 generates a bitstream which, after separation of the background from the signal, is directly received at the receiver 3. Due to the possibility of transmitting static states, the data is transmitted without modulation so that the energy loss caused by eddy currents in the barrier is minimal. As a result, the energy required for transmission of a message is much lower than in the case of transmitting a message in a standard system.

In the proposed embodiment, an electronic compass—a very sensitive sensor made in the MEMS technology is used as the receiver 3. The measurement of the magnetic field is deliberately disturbed by a very low power signal generated on the opposite side of the barrier 6.

The invention also includes a system for monitoring the level of fluid content in a metal air-tight container, wherein said system comprises an air-tight container, preferably a gas cylinder for storing a liquified gas, a valve or a sealed lid, a transmitter 1 inside the container, and a receiver 2 placed outside the container temporarily or permanently, wherein the transmitter and receiver are in the form of the system according the second invention.

In one of the practical embodiments of the invention, the transmitter 1 is placed inside a metal LPG cylinder, where a microprocessor-based electronic system measures the level of a liquid inside the cylinder and transmits the level information to the receiver 3 which is located outside the cylinder.

The invention claimed is:

1. A method for digital wireless communication through a barrier (6) made of a conductive material, preferably metal, consisting in:

transmission of an encoded digital information using a transmitter (1), by generation of a static magnetic field with a stepwise variable spatial orientation of a magnetic induction vector on a first side of the barrier (6), reading a resulting spatial orientation of the magnetic induction vector on a second side of the barrier (6) using an at least one spatial orientation sensor of the magnetic induction vector located in a receiver (3), and decoding the encoded digital information from the stepwise variable spatial orientation of the magnetic induction vector using a reading system (4) connected to the receiver (3), wherein it comprises the following steps:

a. generating a static magnetic field with a first spatial orientation of the magnetic induction vector by an at least one induction coil, preferably of the transmitter (1), by exciting it with a current of a first constant intensity value on the first side of the barrier (6), b. reading, with the receiver (3), a first resulting spatial orientation of the magnetic induction vector of the static magnetic field produced by the at least one induction coil, which the first resulting spatial orientation of the magnetic induction vector of the static magnetic field is additionally distorted by the barrier (6) as well as an Earth's magnetic field, and magnetic objects in the vicinity of a communication path on the second side of the barrier (6);

c. assigning a first digital value in the reading system (4) connected to the receiver (3) to the first resulting spatial orientation of the magnetic induction vector of the static magnetic field;

characterized in that it further comprises the following steps:

d. generating a static magnetic field with a second resulting spatial orientation of the magnetic induction vector of the static magnetic field by reversing the static magnetic field produced by the at least one induction coil by changing the value or polarity of the excitation current of said at least one induction coil;

e. reading, with the receiver (3), the second resulting spatial orientation of the magnetic induction vector of the static magnetic field produced by the at least one induction coil, which the second resulting spatial orientation of the magnetic induction vector of the static magnetic field is additionally distorted by the barrier (6) as well as Earth's magnetic field, and magnetic objects in the vicinity of the communication path on the second side of the barrier (6);

f. assigning a second digital value in the reading system (4) connected to the receiver (3) to the second resulting spatial orientation of the magnetic induction vector of the static magnetic field;

g. encoding a digital information as a sequence of combinations of at least the first or the second resulting spatial orientation of the magnetic induction vector of the static magnetic field by the transmitter (1);

h. reading a combination of at least the first or the second resulting spatial orientation of the induction vector of the static magnetic field by the receiver (3) and decoding the digital information in the reading system (4) connected to the receiver (3).

2. The method according to claim 1 wherein the resulting spatial orientation of the magnetic induction vector of the static magnetic field is generated using at least two axially non parallel oriented induction coils by independent current excitation thereof.

3. The method according to claim 2 wherein the digital information is encoded with more than two resulting spatial orientations of the magnetic induction vector of the static magnetic field.

4. The method according to claim 2 wherein the spatial orientation of the magnetic induction vector of the static magnetic field is measured in at least two geometric dimensions.

5. The method according to claim 1 wherein the encoded digital information is assigned to a particular resulting spatial orientation of the magnetic induction vector of the static magnetic field.

6. The method according to claim 1 wherein the encoded digital information is assigned to a particular sequence of at least two different resulting spatial orientations of the magnetic induction vector of the static magnetic field.

7. The method according to claim 1 wherein the reading of the spatial orientation of the magnetic induction vector of the static magnetic field is performed with the use of highly precise MEMS, Hall or magnetostrictive type sensors of spatial orientation of the static magnetic field.

8. A system for performing digital wireless communication through a barrier (6) made of a conductive material, preferably metal, with the use of a method according to claim 1, comprising a transmitter (1), a digital information encoder (2) in the form of a static magnetic field generator with a stepwise variable spatial orientation of a magnetic induction vector on a first side of the barrier (6), a receiver (3) of a spatial orientation of the magnetic induction vector on a second side of the barrier (6), a reading system (4) and a digital information decoder (5), characterised in that the static magnetic field generator with the stepwise variable spatial orientation of the magnetic induction vector is composed of an at least one induction coil excited with a current of stepwise variable intensity and polarity, and the receiver (3) comprises spatial orientation sensors of a static magnetic field.

9. The system according to claim 8 wherein the spatial orientation sensor of a static magnetic field is of the MEMS type.

10. The system according to claim 8 wherein the receiver (3) is configured to read the spatial orientation of the magnetic induction vector of the static magnetic field in at least two geometric dimensions.

11. The system according to claim 8 wherein the static magnetic field generator with a stepwise variable spatial orientation of the magnetic induction vector is composed of at least two separately excited induction coils oriented axially non-parallel to each other.

12. A system for monitoring the level of fluid content in a metal, air-tight container, the said system comprising an air-tight container, preferably a gas cylinder for storing a liquified gas, and further comprises a valve or a sealed lid, a transmitter (1) inside the container, and a receiver (3) placed outside the container temporarily or permanently, characterised in that the transmitter (1) and the receiver (3) are in the form of a system according to claim 8.

\* \* \* \* \*